United States Patent [19]
Otsuki

[11] Patent Number: 5,847,685
[45] Date of Patent: Dec. 8, 1998

[54] VEHICLE-MOUNTED DISPLAY MECHANISM

[75] Inventor: Akira Otsuki, Iwaki, Japan

[73] Assignee: Alpine Electronics, Inc., Tokyo, Japan

[21] Appl. No.: 718,682

[22] Filed: Sep. 24, 1996

Related U.S. Application Data

[63] Continuation of Ser. No. 107,481, Aug. 17, 1993, abandoned.

[30] Foreign Application Priority Data

Aug. 19, 1992 [JP] Japan .................................... 4-242713
Aug. 19, 1992 [JP] Japan .................................... 4-242714

[51] Int. Cl.⁶ .................................................... G09G 3/36
[52] U.S. Cl. ........................... 345/87; 345/905; 361/681; 248/920; 340/995; 312/7.2
[58] Field of Search .................. 345/7, 87, 905; 312/7.2, 248, 223.2; 248/917–923; 340/995; 361/681

[56] References Cited

U.S. PATENT DOCUMENTS

| | | | |
|---|---|---|---|
| 4,995,680 | 2/1991 | Miruri ........................................ | 312/7.1 |
| 5,145,128 | 9/1992 | Umeda ..................................... | 248/918 |
| 5,173,686 | 12/1992 | Fujihara ................................... | 345/87 |
| 5,276,589 | 1/1994 | Bartlett et al. ........................... | 248/920 |
| 5,359,349 | 10/1994 | Jambor et al. ........................... | 248/918 |

FOREIGN PATENT DOCUMENTS

| | | |
|---|---|---|
| 0-409-232-A2 | 7/1990 | European Pat. Off. . |
| 2-7082 | 11/1990 | Japan ..................................... 361/681 |
| 4-185547 | 11/1990 | Japan .................................. 312/223.2 |

*Primary Examiner*—Amare Mengistu
*Attorney, Agent, or Firm*—Brinks Hofer Gilson & Lione

[57] ABSTRACT

In a vehicle-mounted display system a display projects from a fixed case in a horizontal posture and then is rotated to a raised posture, an end of the display is prevented from projecting outwardly of the fixed case, and the movement of the display in the horizontal posture and its rotation into the raised posture require a series of operations. A TV monitor is supported on a movable bracket by first support points guided on an intermediate case. Link members are rotatably supported by second support points to the TV monitor, and third support points on the link members are guided in the intermediate case. Gears fixed to the movable bracket move over first rack members on a fixed case, and the movable bracket and the intermediate case advance while locked together. When the intermediate case advances, the intermediate and fixed case are locked together, while the intermediate case and the movable bracket are unlocked. The gears then shift from the first to second rack members on the intermediate case, and only the movable bracket advances. Then the third support points are restricted. With further advance of the bracket member, the first support points advance, so that the TV monitor is rotated in a counterclockwise direction to a raised posture.

20 Claims, 16 Drawing Sheets

VEHICLE-MOUNTED DISPLAY MECHANISM

This application is a continuation of application Ser. No. 08/107,481, filed Aug. 17, 1993, now abandoned.

BACKGROUND OF THE INVENTION

1. Field of the Invention

The present invention relates to a vehicle-mounted or onboard display system wherein a display such as a TV monitor is moved into and out of a fixed case mounted on an automobile console panel, for example, and the display is brought into a raised posture outside of the fixed case.

2. Description of the Prior Art

A conventional vehicle-mounted display system is shown in FIG. 15 in an exploded perspective view.

The vehicle-mounted display 1 shown in FIG. 15 comprises a case 2 fixed to an automobile console panel or the like, a pair of guide members (rails) 3 which are partly fixed to vertical inner wall surfaces of the case 2 on both sides thereof, a TV monitor 4 supported on the guide members 3 by a support member 9 and being movable in the directions of arrows A1 or A2 in a horizontal posture, and a lid opening/closing mechanism 12 driven in response to the movement of the TV monitor 4 in the direction A1 or A2. The lid opening/closing mechanism 12 comprises a movable member 5 arranged on an inner bottom surface 2a of the case 2, to be movable in response to the movement of the TV monitor 4 in the direction A2, a lid member 6 rotatably attached to an end of the movable member 5 through a pair of hinges 5a, 5a, a coupling member 7 fixed to a rear surface of the lid member 6, and an opening/closing member 8 attached at its one end to the coupling member 7.

A tension spring 10 has one end locked to one side 5b of the movable member 5, and the other end locked to one vertical inner wall surface of the case 2. The movable member 5 is thereby always urged by the tension spring 10 in the direction A1. Further, a tension spring 11 is stretched between the opening/closing member 8 and the movable member 5, so that the lid member 6 is also always urged in the direction A1.

With the lid opening/closing mechanism 12 thus constructed, when the TV monitor 4 is moved in the direction A2 to be stored in the case 2 in a horizontal posture, a part of the support member 9 strikes against a rear lug 8a of the opening/closing member 8, whereby the opening/closing member 8 is withdrawn in the direction A2 as the TV monitor 4 is further moved into the case 2. Simultaneously, the movable member 5 is also moved in the direction A2 so that the lid member 6 is closed.

FIG. 16 is a perspective view showing the vehicle-mounted display 1 in an automobile console panel.

When using the TV monitor 4 as illustrated, the TV monitor 4 is first moved to project in the direction of A1 while being guided by the guide rails 3 with its posture held horizontally as indicated by (B). Then, after the TV monitor 4 comes into a position where it projects predetermined distance forward of the console panel 13 as shown, the TV monitor 4 is rotated by a motor, which is provided on the support member 9 supporting the TV monitor 4, through an angle suitable to provide a raised posture indicated by (A). Conversely, when storing the TV monitor 4, the TV monitor 4 is first rotated from the raised posture indicated by (A) to the horizontal posture indicated by (B), and then retracted in the direction A2 to be stored in the case 2. At the same time, the lid member 6 is closed as mentioned above.

In front of the console panel 13, in which the vehicle-loaded display 1 is mounted, toward the lower left side on FIG. 16, there is disposed the conventional automobile gear shift lever 14. Thus, the vehicle-mounted display 1 including the TV monitor 4 is mounted in many cases at a location facing vehicular equipment such as the shift lever 14.

Meanwhile, the TV monitor 4 is brought into the raised posture by being rotated about a shaft 9a provided on the support member 9 after it has been completely projected out of the console panel 13. In order to raise the TV monitor 4 outside the fixed case 2, therefore, the support member 9 must be moved to a position where the shaft 9a projects entirely out of the case 2. In other words, the TV monitor 4 must continue advancing while taking a horizontal posture, until the shaft 9a completely projects from the case 2. However, since the shift lever 14 or the like is arranged in front of the TV monitor 4, there is a problem that when the TV monitor 4 advances in the horizontal posture indicated by (B), it may strike against or interfere with operation of the shift lever 14.

Further, the conventional vehicle-mounted display 1 is driven as follows. The TV monitor 4 in the horizontal posture is first driven in the direction A1 by a drive mechanism provided in the case 2. Then, after the TV monitor 4 has been driven to a position where the shaft 9a projects completely from the case 2, it is rotated into the raised posture by a second drive mechanism which is provided in the support member 9, and which has a drive source different from that of the above-described drive mechanism. Therefore, the support member 9 must advance through a long distance until the shaft 9a moves to project from the interior of the case 2, meaning that driving force for moving the support member 9 in direction A1 must be continuously applied through a long distance. Accordingly, the drive mechanism provided in the case 2 requires a long drive arm for transmitting the drive force, resulting in a complicated structure.

Moreover, in the conventional drive method, the drive mechanism for moving the shaft 9a completely out of the case 2 is separate from the drive mechanism for rotating the TV monitor 4 after the shaft 9a has moved out of the case 2, these drive mechanisms employing different drive sources such as motors. Accordingly, disadvantageously the structure is complicated, the load required to move the support member 9 having mounted thereon the second drive mechanism to rotate the TV monitor 4 is increased, and control is complicated.

SUMMARY OF THE INVENTION

With a view to solving the above-mentioned problems in the prior art, an object of the present invention is to provide a vehicle-mounted display system which enables a display such as a TV monitor to be brought into a raised posture without projecting forward of a fixed case to a large extent, and which efficiently applies a force for moving the display member out of the case, and further which enables a single drive source to apply a series of drive forces for moving the display out of the case and then rotating it into a raised posture after the display member has come out of the case.

To achieve this object, first a vehicle-mounted display system includes a display movable into and out of a fixed case and rotated from a horizontal posture to a raised posture when the display has moved out of the fixed case, wherein a movable bracket is driven to advance and retract within the fixed case, and a raising mechanism for rotating the display member from the horizontal posture into the raised posture during advance of the movable bracket is provided between the movable bracket and guides for guiding movement of the movable bracket.

Secondly, a vehicle-mounted display system includes a display which is moved into and out of a case and rotated from a horizontal posture to a raised posture when the display has moved out of the case, the display including a fixed case attached to a vehicle, an intermediate case capable of advancing and retracting within the fixed case, a movable bracket supporting the display and being capable of advancing and retracting within the intermediate case, a drive mechanism for applying a driving force to the movable bracket in the direction of its advance, a lock mechanism for locking the intermediate case and the fixed case to each other when the intermediate case has advanced within the fixed case through a predetermined distance, and a raising mechanism for rotating the display member from the horizontal posture into the raised posture by a moving force of the movable bracket advancing within the intermediate case after the intermediate case has been locked.

According to the first above-described aspect of the invention, the movable bracket is driven to advance and retract within the fixed case, and the raising mechanism for rotating the display member in a horizontal posture into a raised posture during advance of the movable bracket is provided between the movable bracket and the guide for guiding movement of the movable bracket, and the display member is raised by the raising mechanism midway of the movement of the bracket member when the bracket member is moved out of the fixed case. Therefore, the distance by which the display member projects forward of the fixed case is reduced.

Also, in accordance with the second aspect of the invention, when the intermediate case moves through a predetermined distance within the fixed case, the intermediate case and the fixed case are locked together by the lock mechanism. When the movable bracket is moved within the intermediate case after the intermediate case has been locked, the display member is rotated from the horizontal posture to the raised posture by the raising mechanism, utilizing a moving force of the movable bracket. Thus, the raising operation of the display member is performed in the course of moving the display out of the fixed case, whereby the distance by which the display member projects forward of the fixed case at the time of raising is reduced. Further, the movement of the display out of the fixed case and the raising operation thereof outside the fixed case are performed merely by applying the moving force to the movable bracket.

DETAILED DESCRIPTION OF THE INVENTION

Figure 1:
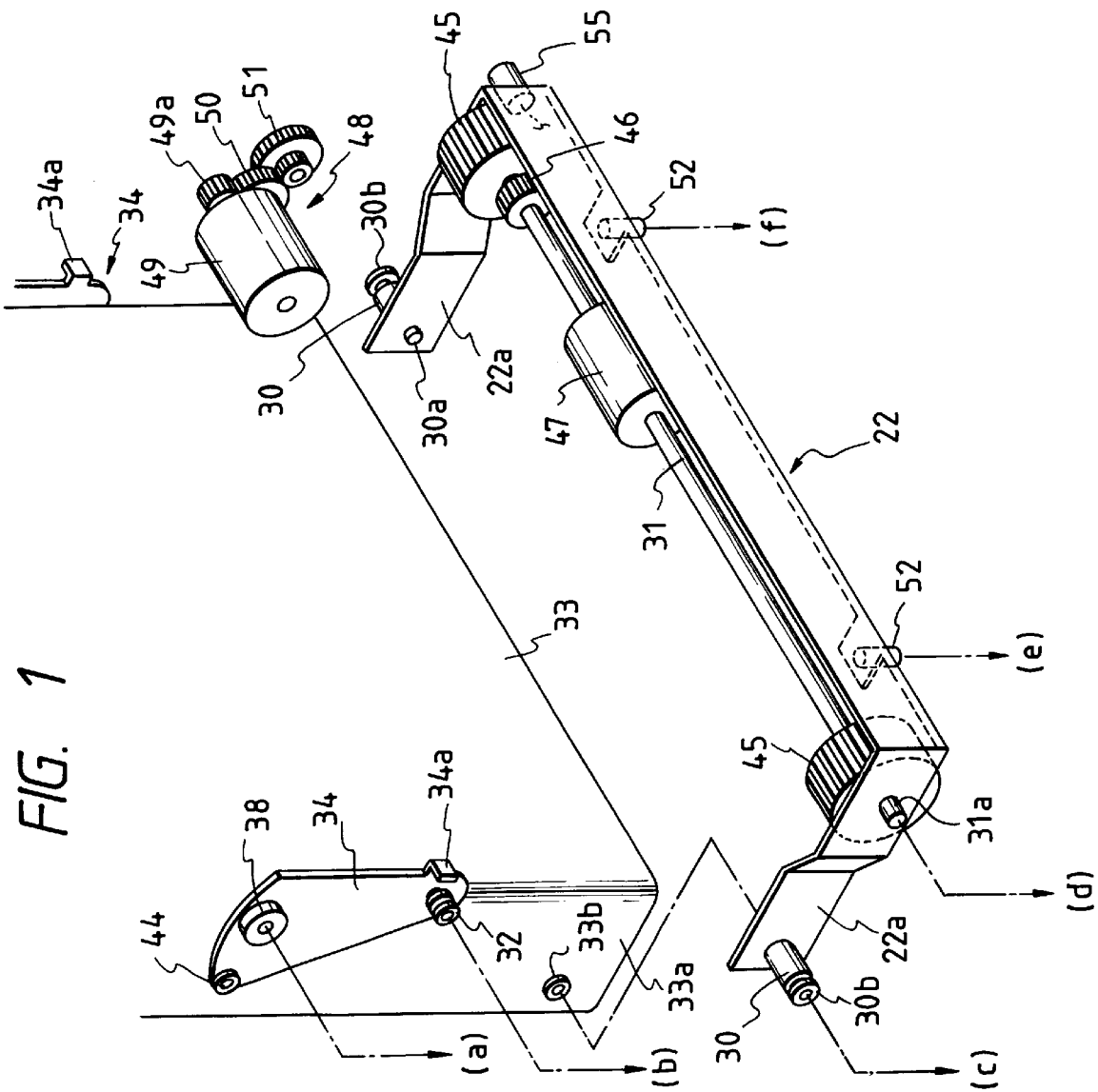
FIG. 1 is an exploded perspective view of a TV monitor as a display and a movable bracket for supporting the TV monitor.

An embodiment of the present invention is described hereinafter with reference to the drawings.

The vehicle-mounted display system illustrated in FIGS. 1 to 6 includes a fixed case 20 attached to a vehicle body, an intermediate case 21 movable between a position where it is stored in the fixed case 20 and a position where it is projected by a slight distance from an opening 20a of the fixed case 20, and a movable bracket 22 supported in the intermediate case 21 to be movable with respect to the intermediate case 21.

The movable bracket 22 is channel-like as viewed from above and has a pair of legs 22a between which a rotatable shaft 31 and a TV monitor 3 are disposed in a rotatable manner. Large gears 45 are fixed to the rotatable shaft 31 at positions near both its ends, and a small gear 46 for transmitting the drive force of a driver 48 is fixed to an inner side of one large gear 45. Also, at an intermediate portion of the rotatable shaft 31, there is a winder 47 for (in response to rotation of the rotatable shaft 31) winding or unwinding a flexible ribbon cable or the like (not shown) adapted to transmit electric power and control signals to the driver 48.

Near the free ends of both the legs 22a, there are column-shaped first guide members 30 (first support points) projecting outwardly. These first guide members 30 are inserted in respective first guide slots (raising guide portions) 28 formed in the intermediate case 21 shown in FIG. 2. Opposite ends of the rotatable shaft 31 are also projecting outwardly of both the legs 22a and serve as second guide members 31a which are inserted in the respective first guide slots 28 similarly to the first guide members 30. The movable bracket 22 can move in the directions of arrows A1 and A2 with both the first guide member 30 and the second guide member 31a guided by the common first guide slot 28 on each side.

The first guide members 30 are provided at their projected ends with stop rings 30b to prevent the first guide members 30 from slipping from the first guide slots 28. Also, pin members 30a project inwardly from inner surfaces of both the legs 22a of the movable bracket 22 in coaxial relation to the first guide members 30. Near the respective lower ends of both lateral surfaces 33a of the TV monitor 33 in FIG. 1, there are insert receivers 33b into which the pin members 30a are rotatably inserted. Thus, the TV monitor 33 is supported rotatably with respect to the movable bracket 22 by the pin members 30a in coaxial relation to the first guide members 30.

Link members 34 are attached to an intermediate portion of the TV monitor 33 at positions above the insert receivers 33b. Each of the link members 34 is a plate having a triangular shape as viewed from the side, the triangular plate being rotatably attached at one apex to the TV monitor 33 by a pin member (second support point) 44. A third guide member (third support point) 32 projects at another apex of the link member 34, and is inserted into a second guide slot (restricting guide) 29 formed in the intermediate case 21 shown in FIG. 2. Also, an abutment lug 34a is formed just above the apex of the link member 34 which is bent as shown and, when the link member 34 is rotated, the abutment lug 34a abuts against a corresponding one of fore ends 21e of bent portions 21d formed at the upper ends of both legs 21a of the intermediate case 21 (see FIG. 14). Near the remaining apex of the link member 34, there is rotatably attached a roller 38 inserted to and supported by a later-described guide member 39.

The driver 48 shown in FIG. 1 includes a motor 49 used as a common drive source for moving the movable bracket 22 in the directions A1 and A2, moving the intermediate case 21 (as described later in detail), and raising the TV monitor 33, a small gear 49a fixed to a drive shaft of the motor 49, and a train of speed reducing gears 50, 51 meshed with the small gear 49a. The driver 48 is attached to the movable bracket 22. Also, the speed reducing gear 51 is meshed with the small gear 46 fixed to the rotatable shaft 31, whereby the drive force of the motor 49 is transmitted to the rotatable shaft 31.

The movable bracket 22 is partly bent inward at two locations along its lower end, as shown in FIG. 1, and a first pin-like lock projection 52 is attached to each of the bent portions to extend downwardly in the drawing.

When the movable bracket 22 is moved rearward in the direction A2 in the intermediate case 21, the first lock projections 52, 52 are locked to lock arms 42 (shown in FIG. 2) provided in the intermediate case 21, respectively, thereby locking together the movable bracket 22 and the intermediate case 21.

Figure 2:
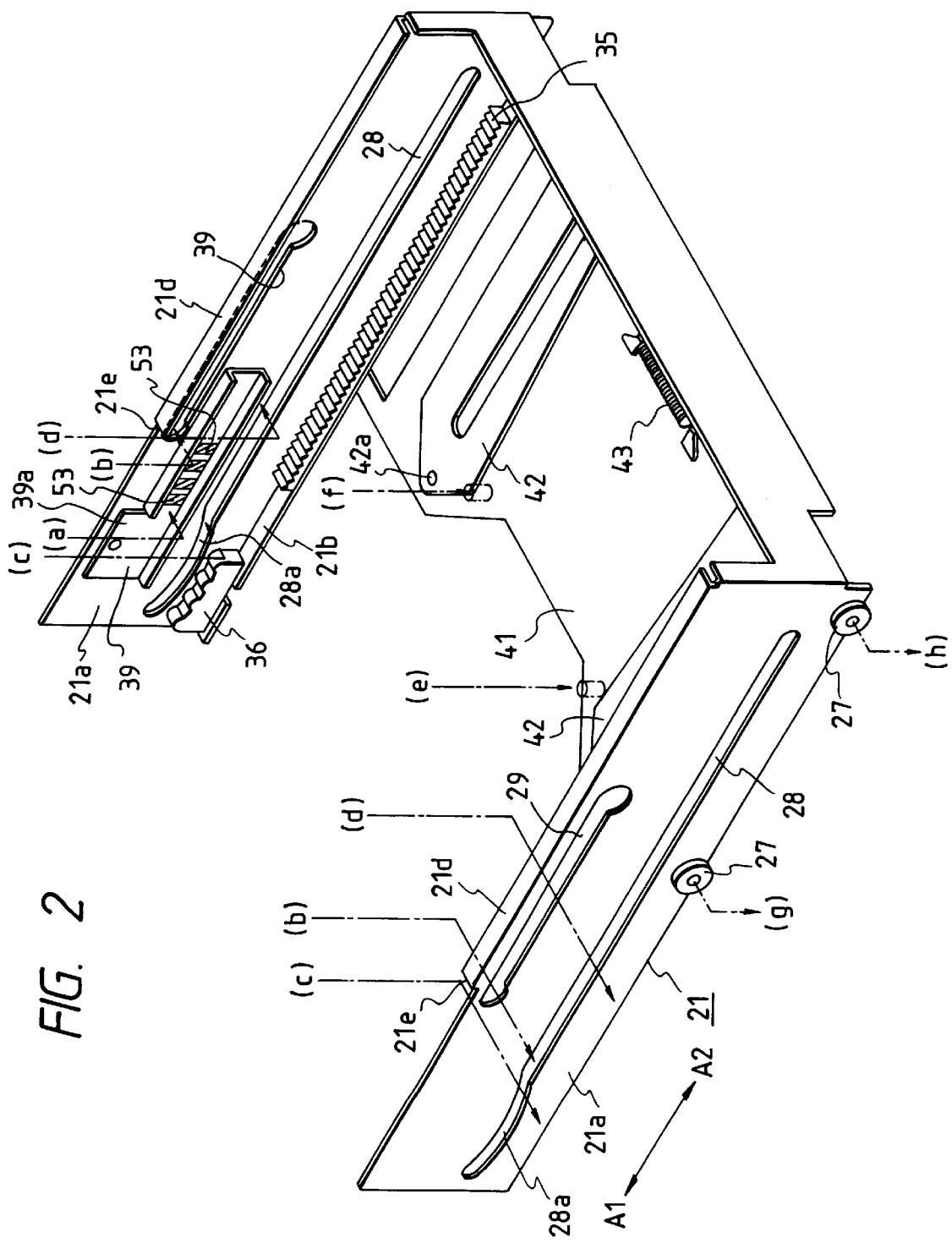
FIG. 2 is a perspective view of an intermediate case for movably supporting the movable bracket.

As shown in FIG. 2, the intermediate case 21 is channel-like as viewed from above, and four rollers 27 are rotatably attached to outer surfaces of both its legs (guides) 21a by two rollers on each side spaced apart a predetermined distance. These rollers 27 are inserted into guide members 2 fixed to both side walls 20c of the fixed case 21 shown in FIG. 3, so that the intermediate case 21 is supported movably in the directions A1 and A2 with respect to the fixed case 20.

In both the legs 21a of the intermediate case 21, the aforesaid first guide slots 28 and the second guide slots 29 are formed parallel to the directions A1 and A2. Of these guide slots, inserted into each first guide slot 28 are both the aforesaid first guide member 30 and second guide member 31a, both projecting from the movable bracket 22, and inserted into each second guide slot 29 is the aforesaid third guide member 32 of the link member 34 provided on the TV monitor 33. Note that in FIGS. 1 and 2, mutual relationships in assembly of the components are indicated by characters (a) to (d).

The first guide slot 28 is formed to slightly curve at 28a in its end portion on the same side as the opening 20a. This curved portion 28a is formed following a path of movement of the first guide member 30 when the TV monitor 33 is rotated. The second guide slot 29 is linear in shape to guide the third guide member 32 provided on the link member 34, and the movement of the third guide member 32 in the direction A1, i.e., the movement of the link member 34 in the direction A1 with respect to the intermediate case 21, is restricted by a fore end of the second guide slot 29.

Lower ends of both legs 21a of the intermediate case 21 are bent inwardly to form bent lugs 21b, and second rack members 35 are respectively fixed to upper surfaces of the bent lugs 21b as shown. Also, click (ratchet) members 36 are elastically supported at front end portions of both the legs 21a.

Figure 7:
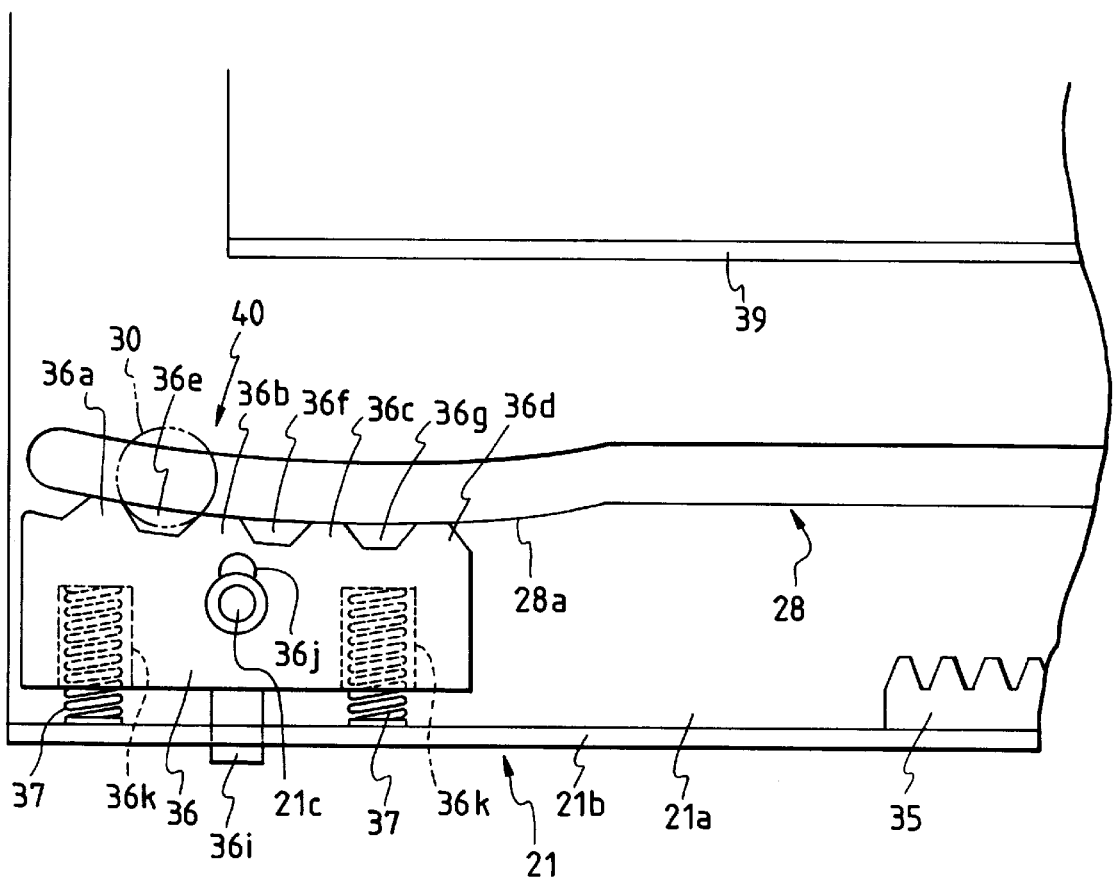
FIG. 7 is an enlarged front view primarily showing a section inclusive of a click member.

FIG. 7 shows click member 36 enlarged. The click member 36 has a plurality of convex portions, indicated by 36a to 36d, formed on its upper surface as shown. These convex portions 36a to 36d are formed such that their apexes are located along a lower edge of the curved portion 28a of the first guide slot 28. A plurality of concave portions 36e to 36g are each formed between adjacent ones of the convex portions 36a to 36d, and the first guide member 30 inserted in the first guide slot 28 is ratchetly engaged in each of the concave portions 36e to 36g.

A column-like pin 36i projects from the center of a bottom surface of the click member 36, and the bent lug 21b lying below the click member 36 is formed with a cutout or a through hole into which the pin 36i is inserted. Also, a long hole 36j is bored at a central portion of the click member 36 to penetrate therethrough in a direction perpendicular to the drawing sheet, and a pin 21c projecting inwardly from an inner surface of the leg 21a is loosely fitted in the long hole 36j. Further, on both sides of the pin 36i, there are a pair of spring insertion holes 36k into which springs 37, respectively, fit, the lower ends of the springs 37 being pressed against the bent lug 21b. The click member 36 is always urged by the springs 37 upwardly in the drawing. Accordingly, when the first guide member 30 engages in any of the concave portions 36e to 36g under such a normally urged condition, the first guide member 30 is held in that one of the concave portions 36e to 36g. The first guide member 30, the click member 36, and the springs 37 cooperate, as mentioned above, to jointly constitute a click (ratchet) mechanism 40.

Between the first guide slots 28 and the second guide slots 29 formed in both the legs 21a of the intermediate case 21, there are fixed guide members 39 into which are inserted the rollers 38 projecting from the link members 34 attached to the TV monitor 33. The guide members 39 have a similar shape to that of the aforesaid guide members 26. However, open portions 39a are formed at front end portions of the guide members 39 on the upper side as shown, so that when the TV monitor 33 is rotated into a raised posture, the rollers 38 can be moved upwardly leaving the guide members 39.

Figure 8:
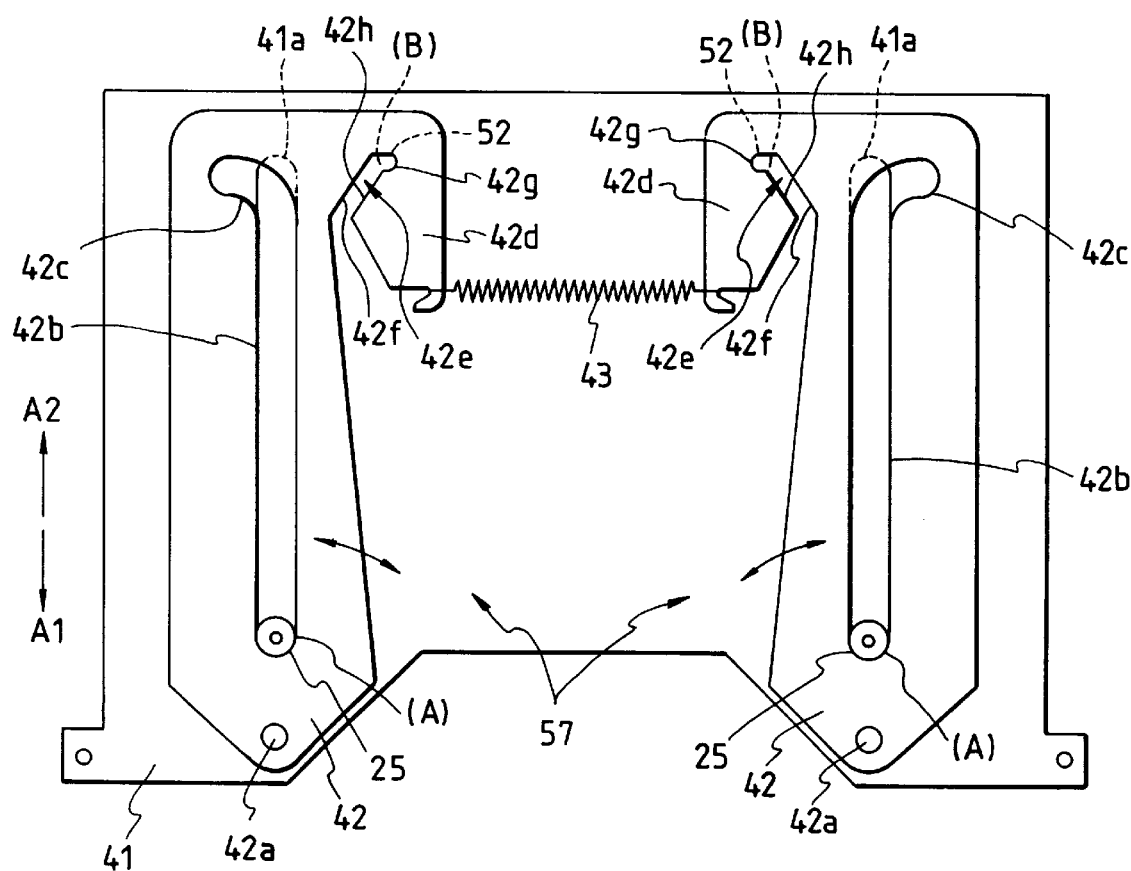
FIG. 8 is a plan view showing details of a lock mechanism inclusive of lock arms.

A support plate 41 constituting a lower surface of the intermediate case 21 is fixed to lower surfaces of the bent lugs 21b formed to project from both the legs 21a of the intermediate case 21, and a pair of lock arms 42 are rotatably disposed on the support plate 41. FIG. 8 is a plan view showing details of the support plate 41 and the lock arms 42.

Figure 3:
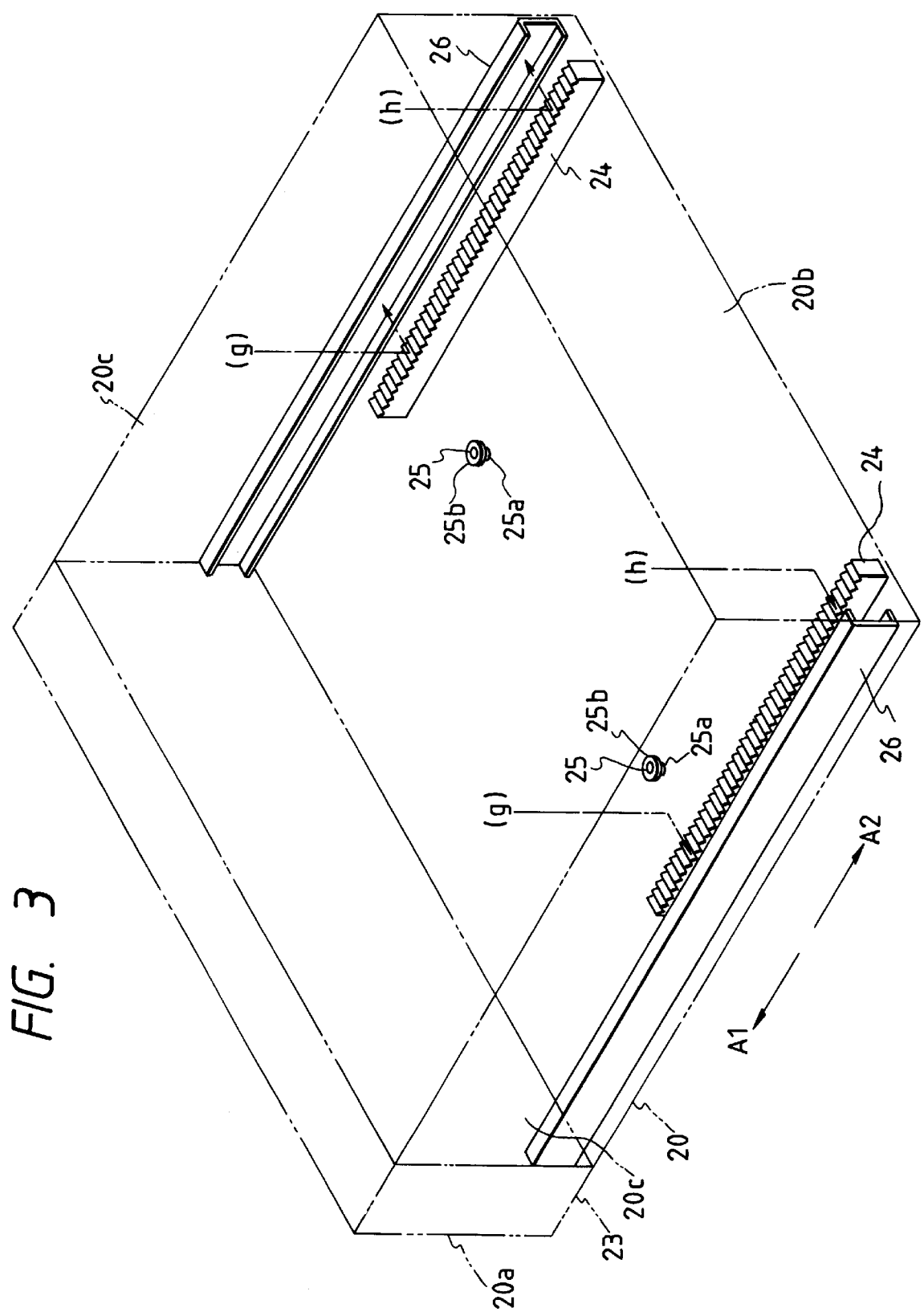
FIG. 3 is a perspective view of a fixed case for movably supporting the intermediate case.

The support plate 41 is formed with a pair of guide slots 41a into which are respectively inserted second lock projections 25 projecting from an inner bottom 20b of the fixed case 2 shown in FIG. 3. These guide slots 41a extend linearly and parallel to the direction of movement of the intermediate case 21.

The lock arms 42 are pivotably supported by pivot points 42a provided on the support plate 41 in alignment with respective extensions of the guide slots 41a. A spring 43 is stretched between the free ends of the two lock arms 42 to always urge the lock arms 42 so that their free ends approach each other.

The lock arms 42, constituting a part of a lock mechanism 57, lock together the intermediate case 21 and the movable bracket 22 until the intermediate case 21 and the movable bracket 22 advance within the fixed case 20 in the direction A1 through a predetermined distance (assuming a start point such that the intermediate case 21 and the movable bracket 22 are fully stored in the fixed case 20) and then release the intermediate case 21 and the movable bracket 22 from their locked state, and also lock the fixed case 20 and the intermediate case 21 when the movable bracket 22 further advances in the direction A1.

In the lock arms 42, there are formed guide slots 42b extending substantially parallel to the direction of movement of the intermediate case 21, with linear portions of the guide slots 42b lying over the linear guide slots 41a formed in the support plate 41 as shown in FIG. 8. Ends of the guide slots 42b in the direction A2 (i.e., the upper ends of the guide slots 42b as viewed in FIG. 8) are arcuately curved outwardly toward a perpendicular direction to their linear portions so as to provide arc-shaped portions (second lock recesses) 42c. Further, the opposite free ends of the lock arms 42 are formed into latch portions 42d between which the spring 43 is stretched.

Intermediate the arc-shaped portions 42c and the latch portions 42d of the lock arms 42, guide portions 42e are formed to guide the first lock projections 52 projecting from the movable bracket 22. At an innermost part of each of the guide portions 42e, there is formed a hold portion (first lock recess) 42g for holding the first lock projection 52 provided on the movable bracket 22 when the movable bracket 22 and the intermediate case 21 are moved in the direction A2 and stored in the fixed case 20, and a second slope surface 42h for guiding the first lock projection 52 when it escapes from the hold portion 42g. When the movable bracket 22 is moved in the direction A2 from a condition that the movable bracket 22 is not locked to the intermediate case 21 to a condition that the first lock projections 52 provided on the movable bracket 22 are locked by the lock arms 42, the first lock projections 52 are introduced to the hold portions 42g while being guided by first slope surfaces 42f of the lock arms.

The arc-shaped portions 42c of the lock arms 42 and the second lock projections 25 on the fixed case 20 cooperate to jointly constitute a second lock, while the hold portions 42g of the lock arms 42 and the first lock projections 52 of the movable bracket 22 cooperate to jointly constitute a first lock.

Figure 4:
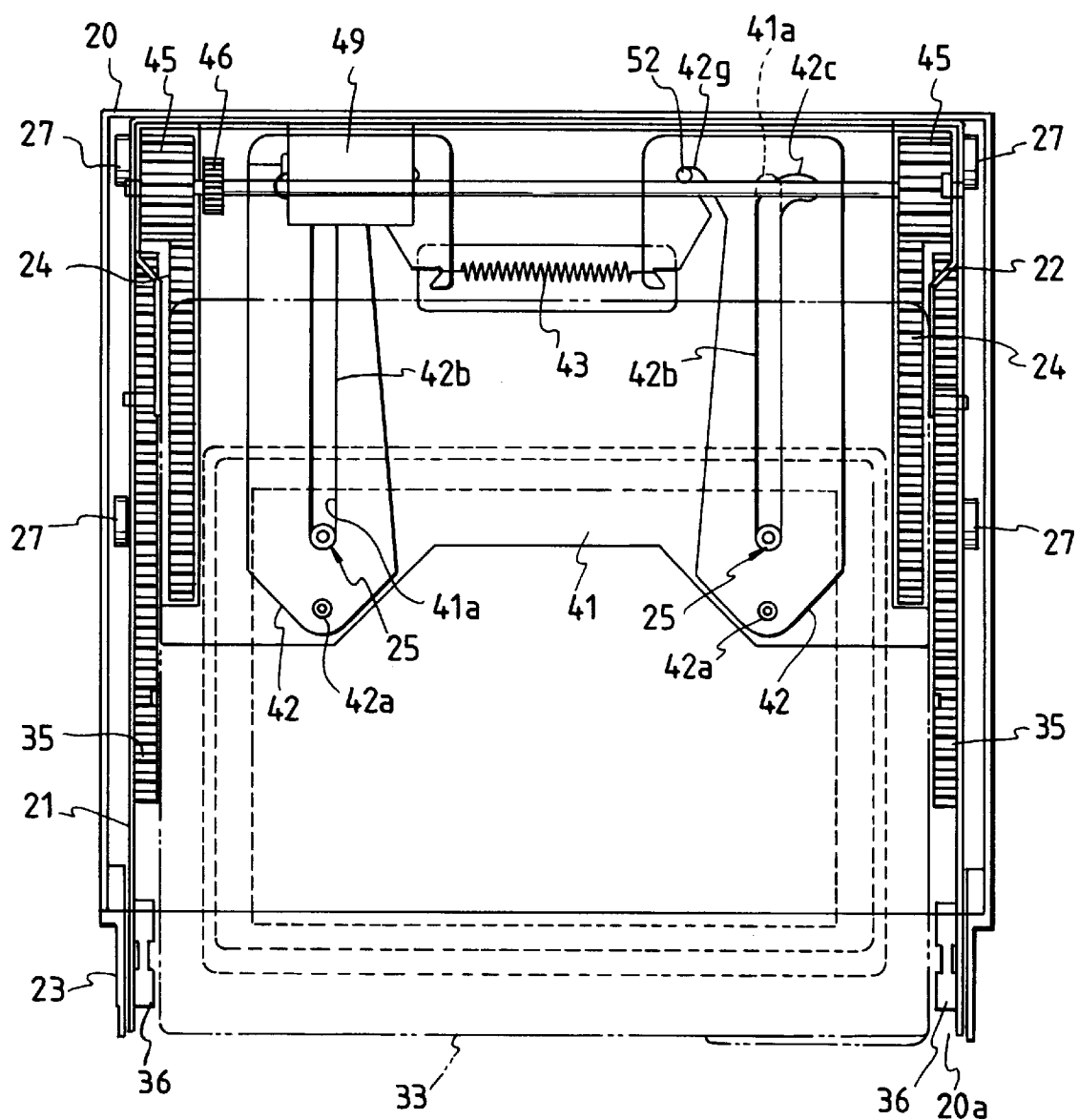
FIG. 4 is a plan sectional view of an assembled state of the movable bracket constructed as shown in FIGS. 1 to 3.

With the above described structure, when the intermediate case 21 is stored in the fixed case 20 as shown in FIG. 4, the second lock projections 25 are moved to a position at the lower ends of the guide slots 41a formed in the support plate 41 and the guide slots 42b formed in the lock arms 42, as indicated by (A) in FIG. 8. At this time, the first lock projections 52 projecting downwardly from the movable bracket 22 are positioned in the hold portions 42g of the lock arms 42, as indicated by (B) in FIG. 8.

In the condition that the second lock projections 25 provided on the fixed case 20 penetrate the guide slots 41a of the support plate 41 and then are inserted into the linear portions of the guide slots 42b of the lock arms 42, as shown in FIG. 8, the lock arms 42 are restricted by the pivot points 42a and the second lock projections 25 to be held in a state that the linear portions of the guide slots 42b thereof align with and lie over the guide slots 41a of the support plate 41. Accordingly, both the lock arms 42 are kept lying a parallel (as shown in FIG. 8) against an urging force of the spring 43. Therefore, the first lock projections 52 provided on the movable bracket 22 cannot escape from the hold portions 42g of the lock arms 42, so that the intermediate bracket 22 and the intermediate case 21 remain locked together.

From the stored state shown in FIGS. 4 and 8, when the large gears 45 are driven by the motor 49 mounted to the movable bracket 22 shown in FIG. 1 and the movable bracket 22 is driven in the direction A1 upon the large gears 45 meshing with first rack members 24 provided on the fixed case 20, the movable bracket 22 and the intermediate case 21 locked together through the first lock projections 52 both advance together in the direction A1 within the fixed case 20. With this movement, the second lock projections 25 on the fixed case 20 slide in the guide slots 41a of the support plate 41 and the linear portions of the guide slots 42b of the lock arms 42, so that the bracket moves in the direction A2 from the position indicated by (A) in FIG. 8.

When the second lock projections 25 relatively moving in the direction A2 reach the rear ends (i.e., the upper ends as viewed in FIG. 8) of the guide slots 41a of the support plate 41 and of the guide slots 42b of the lock arms 42, the lock arms 42 start pivoting about the pivot points 42a by the urging force of the spring 43 so that their free ends approach each other. This angular movement causes the second lock projections 25 to enter the arc-shaped portions 42c of the guide slots 42b of the lock arms 42 and the first lock projections 52, so far engaging in the hold portions 42g, are simultaneously disengaged from the hold portions 42g.

More specifically, as the second lock projections 25 enter the arc-shaped portions 42c of the guide slots 42b, the lock arms 42 start pivoting. With the pivoting forces of the lock arms 42, the first lock projections 52 escape from the hold portions 42g and move to positions for coming into abutment against the slope surfaces 42h. Since the large gears 45 provided on the movable bracket 22 continue rotating while meshing with the first rack members 24 on the fixed case 20, the movable bracket 22 further receives the moving force in the direction A1. Hence, the first lock projections 52 integrally projecting from the movable bracket 22 move in the direction A1 to slide along the second slope surfaces 42h, thereby further pivoting the lock arms 42. Thus, in the state shown in FIG. 9 that the second lock projections 25 provided on the fixed case 20 are engaged in blind ends of the arc-shaped portions 42c of the guide slots 42b of the lock arms 42, the lock arms 42 are fully pivoted and the intermediate case 21 are locked to the fixed case 20 by cooperation of the arc-shaped portions 42c and the second lock projections 25 engaging in the arc-shaped portions.

Figure 9:
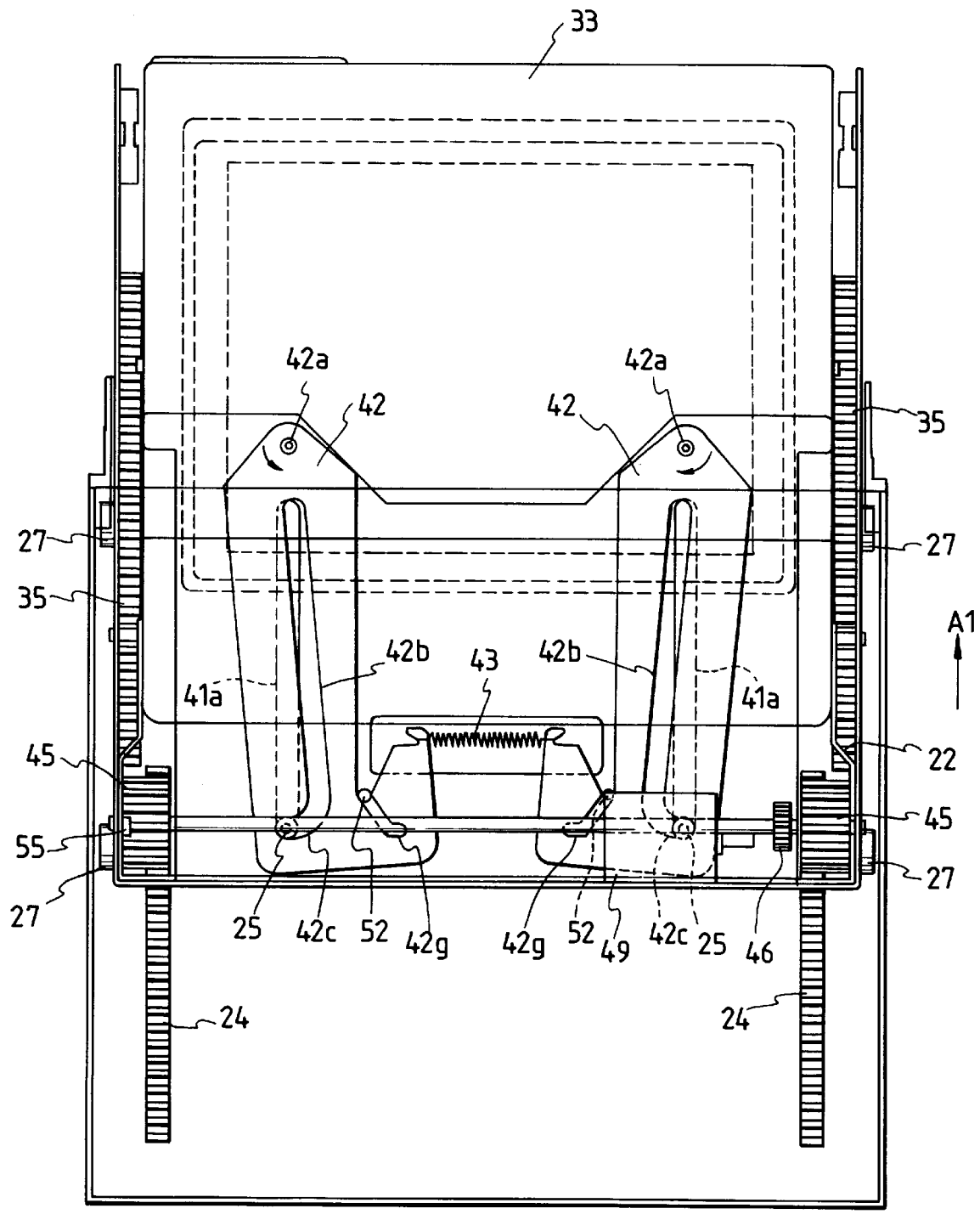
FIG. 9 is a plan view of an operative state of the vehicle-mounted display detailed in FIGS. 1 to 8.
Figure 10:
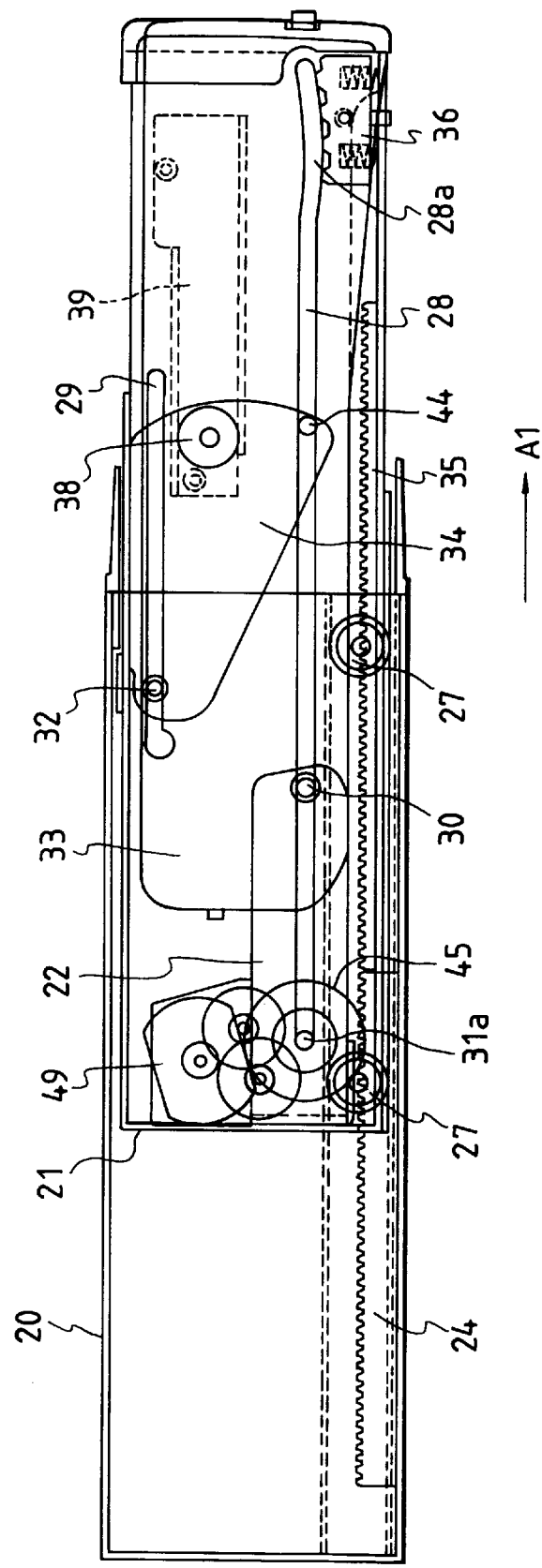
FIG. 10 is a side view of an operative state of the vehicle-mounted display detailed in FIGS. 1 to 8.

At the time the above locking is completed as shown in FIG. 9, the first lock projections 52 escape from the guide portions 42e of the lock arms 42, following which only the movable bracket 22 relatively advances in the direction A1 within the locked intermediate case 21. More specifically, when the large gears 45 are continuously driven after the fixed case 20 and the intermediate case 21 are fully locked to each other, the large gears 45 shift from the first rack members 32 on the fixed case 20 to the second rack members 35 on the intermediate case 21. After that, the large gears 45 are held meshed with the second rack members 35 on the intermediate case 21 for moving the movable bracket 22 to advance in the direction A1 within the intermediate case 21.

The lock arms 42 are pulled by the spring 43 to approach each other and kept in such a stable state under tension. The urging force of the spring 43 prevents the lock arms 42 from accidentally pivoting due to external vibrations, and hence prevents the second lock projections 25 from disengaging from the arc-shaped portions 42c.

Figure 5:
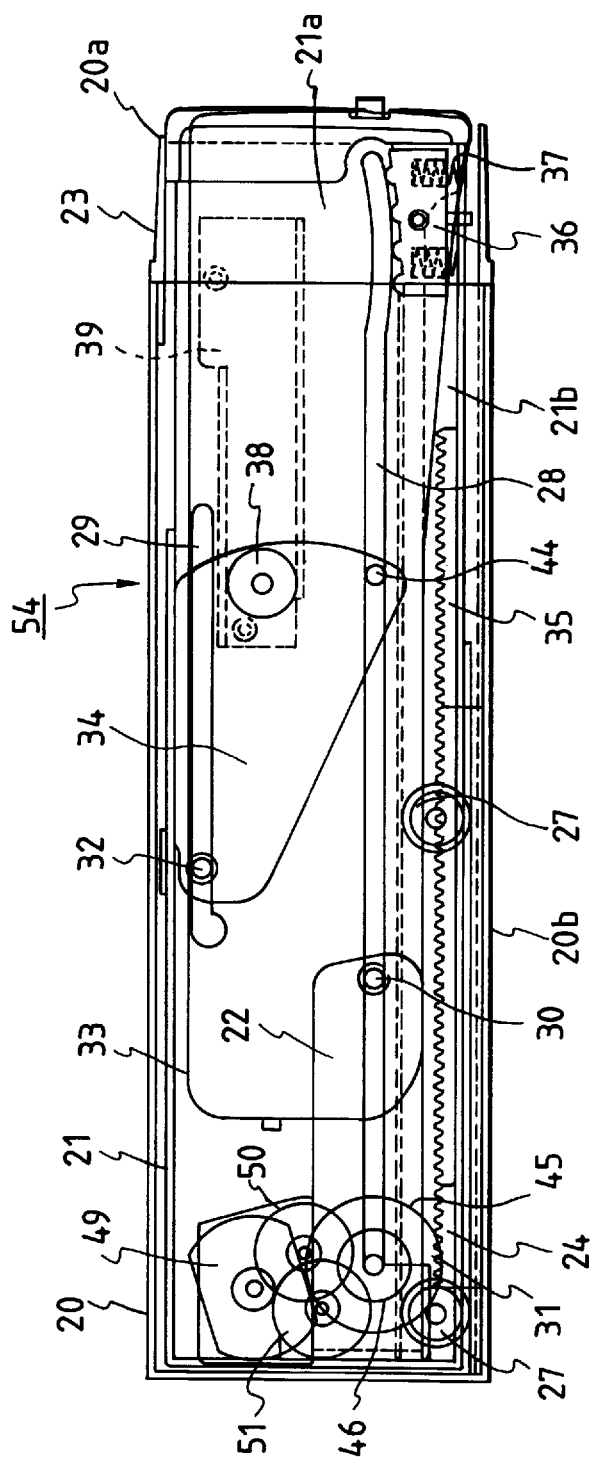
FIG. 5 is a side sectional view of a vehicle-mounted display shown in FIG. 4.
Figure 6:
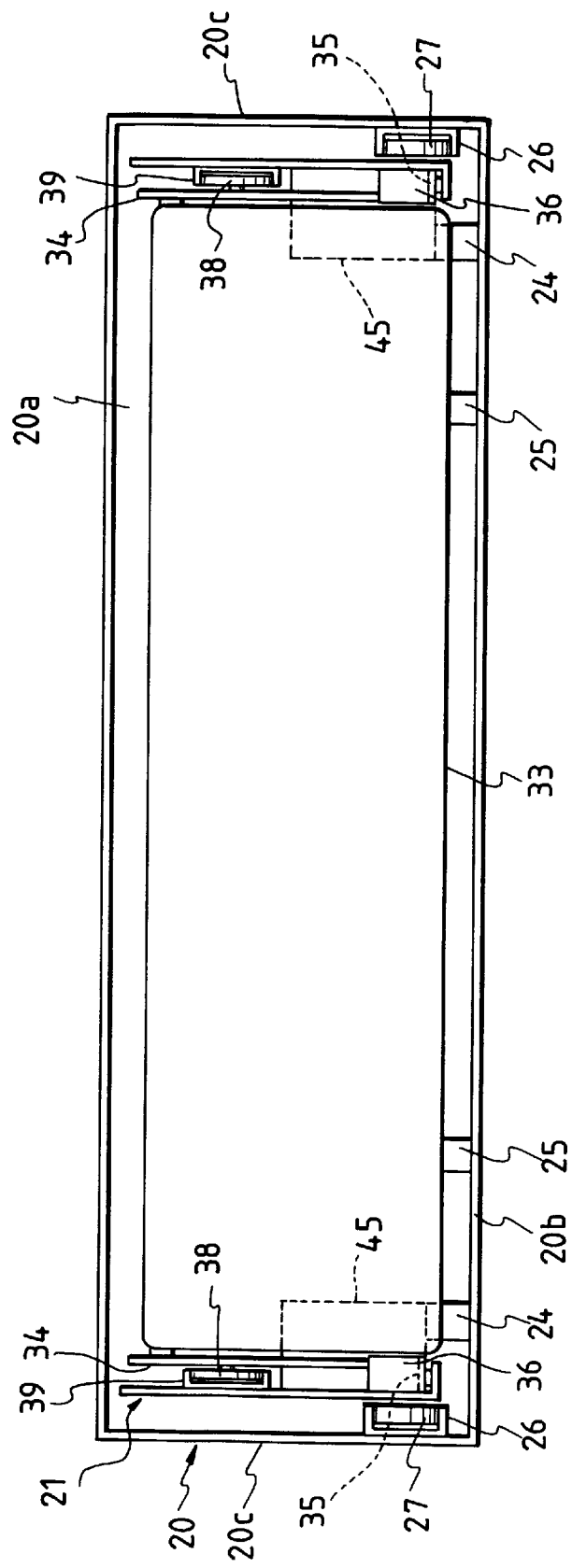
FIG. 6 is a front view of the vehicle-mounted display shown in FIGS. 4 and 5.

In this embodiment, the first guide members 30 for rotatably supporting the TV monitor 33 on the movable bracket 22, the pin members 44 for rotatably coupling the intermediate portion of the TV monitor 33 and the link members 34, the second guide slots 29 formed in both the legs 21a of the intermediate case 21 for allowing the third guide members 32 to move forwardly of the fixed case 20 through a predetermined distance, and the first guide slots 28 for guiding the first guide members 30 forwardly of the third guide members 32 with further advance of the movable bracket 22 after the third guide members 32 have reached fore ends of the guide slots 29 and come under restriction in movement, cooperate to jointly constitute a raising mechanism 54 (shown in FIG. 5).

As shown in FIG. 3, a nose 23 made of synthetic resin is attached to the opening 20a of the fixed case 20, and the pair of first rack members 24 are fixed to the inner bottom 20b to extend parallel to the directions A1 and A2 in which the intermediate case 21 and the movable bracket 22 move. Inwardly of the first rack members 24, the pair of second lock projections 25 project from the inner bottom 20b. The second lock projections 25 each comprise a pin projection 25a and a stop ring 25b disposed at a free end of the pin projection 25a.

Fixed to inner surfaces of both the side walls 20c of the fixed case 21 are the pair of guide members 26 for movably guiding the intermediate case 21. The guide members 26 are each channel-like in cross-section and receive therein the four rollers 27 attached to the lateral end surfaces of the intermediate case 21, with the two rollers on each side. Note that in FIGS. 2 and 3, mutual engaging relationships between the rollers 27 and the guide members 26 are indicated by characters (g) to (h).

Operation of the vehicle-mounted display system having the above structure is now described.

FIGS. 4 and 5 show a state where the intermediate case 21 and the movable bracket 22 are both stored in the fixed case 20. By actuating an operation switch (not shown) in such a state, the motor 49 operates. The driving force of the motor 49 is transmitted to the small gear 46 through the speed reducing gears 50, 51 for rotating the rotatable shaft 31 in one direction (the clockwise direction in FIG. 5).

At this time, the linear portions of the guide slots 42b of the lock arms 42 provided on the intermediate case 21 lie over the guide slots 41a formed in the support plate 41 of the intermediate case 21, as shown in FIG. 8, whereby the second lock projections 25, 25 can each move linearly in both the guide slots 41a and 42b so that the intermediate case 21 is movable with respect to the fixed case 20. Also at this time, the movable bracket 22 and the intermediate case 21 are locked together by cooperation of the first lock projections 52 and the hold portions 42g of the lock arms 42, as described above in connection with FIG. 8. When the large gears 45 provided on the movable bracket 22 are driven to rotate by the motor 49 in the above state, the large gears 45 are first moved while meshing with the first rack members 24 on the fixed case 20, whereby the intermediate case 21 and the movable bracket 22 advance together in the direction A1 over the fixed case 20.

With the movement of the intermediate case 21 and the movable bracket 22 in the direction A1, the second lock projections 25 projecting on the inner bottom 20b of the fixed case 20 move in the direction A2 relatively to the intermediate case 21 from the position indicated by (A) in FIG. 8. When the intermediate case 21 advances in the direction A1 through a predetermined distance, the second lock projections 25 enter the arc-shaped portions 42c of the lock arms 42 for pivoting the lock arms 42, as explained above, whereby the fixed case 20 and the intermediate case 21 are locked together by cooperation of the arc-shaped portions 42c and the second lock projections 25. Simultaneously, the first lock projections 52 provided on the movable bracket 22 disengage from the hold portions 42g, releasing the movable bracket 22 and the intermediate case 21 from the locked state. The intermediate case 21 is thereby stopped on the fixed case 20 at the position shown in FIG. 9, following which only the movable bracket 22 is allowed to advance in the direction A1 over the intermediate case 21.

More specifically, when the intermediate case 21 and the movable bracket 22 are moved to the position shown in FIG. 9, the first rack members 24 (secured onto the fixed case 20) align with the second rack members 35 secured onto the intermediate case 21) in series such that their teeth crests are arranged substantially in line side by side. Thus, when the intermediate case 21 advances together with the movable bracket 22 in the direction A1 over the fixed case 20, the large gears 45 are turned while meshing with only the first rack members 24 on the fixed case 20, so that the intermediate case 21 and the movable bracket 22 advance in the direction A1 by the driving force of the large gear 45. Then, after the fixed case 20 and the intermediate case 21 are locked together, and the intermediate case 21 and the movable bracket 22 are released from the locked state as shown in FIG. 9, the large gears 45 shift from the first rack members 24 to the second rack members 35 on the intermediate case 21. Following that, only the movable bracket 22 advances by rotating force of the large gears 45 in the direction A1 over the intermediate case 21 which has been locked and stopped.

In this way, the intermediate case 21 and the movable bracket 22 are moved together over the fixed case 20 to the position of FIG. 9 and, thereafter, the intermediate case 21 is locked to the fixed case 20 and only the movable bracket 22 is advanced in the direction A1. During that process, the motor 49 continues rotating so that the advance of the intermediate case 21 and the movable bracket 22 as one piece and the subsequent advance of only the movable bracket 22 are performed in a series of operations.

During this series of operations as shown in FIGS. 4, 5, 9 and 10, the rollers 38 of the link members 34 attached to the TV monitor 33 are supported and guided by the guide members 39 provided on both side walls of the intermediate case 21, allowing the TV monitor 33 to advance in the direction A1 while taking a horizontal posture.

Figure 11:
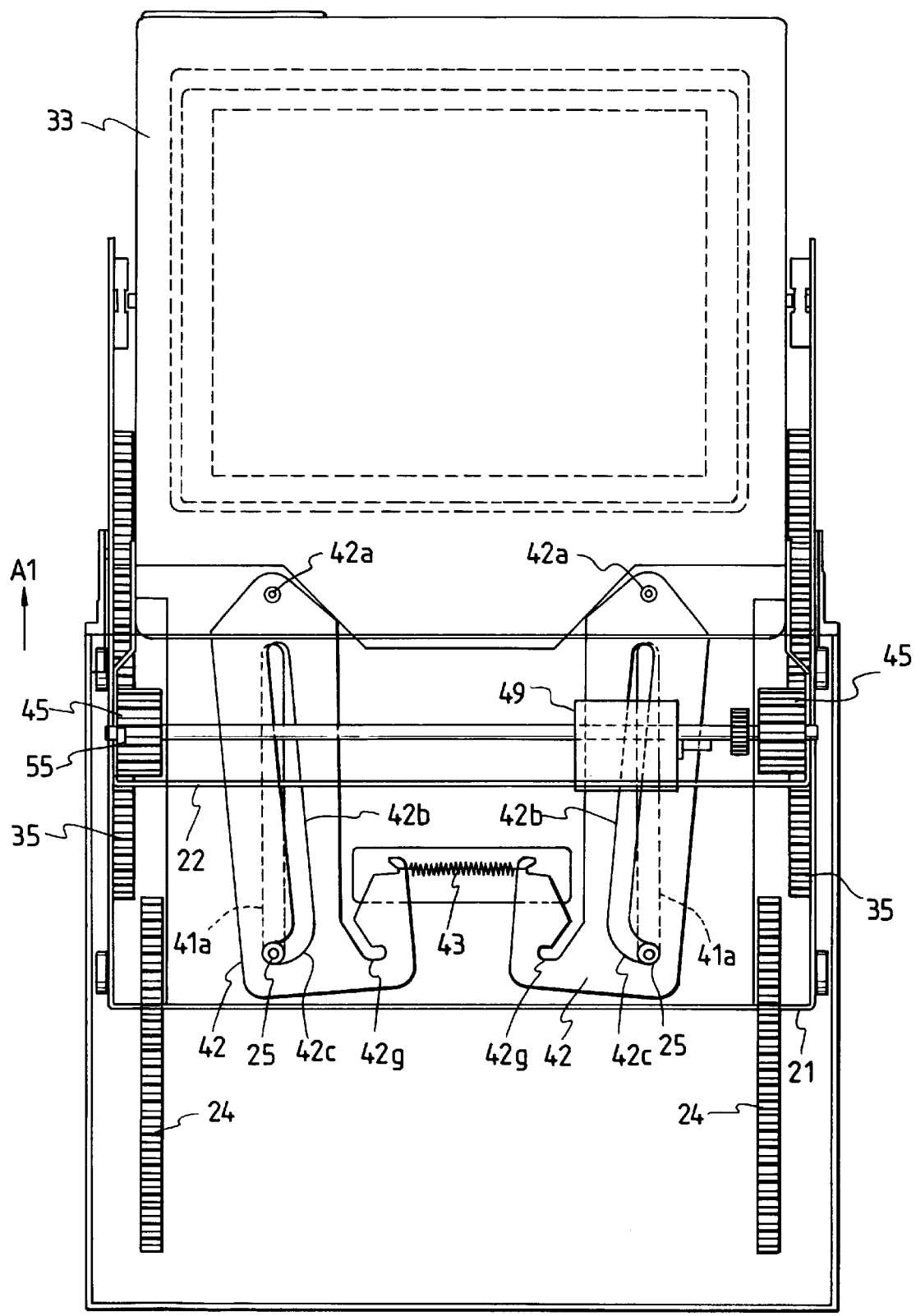
FIG. 11 is a plan view of an operative state of the vehicle-mounted display detailed in FIGS. 1 to 8.
Figure 12:
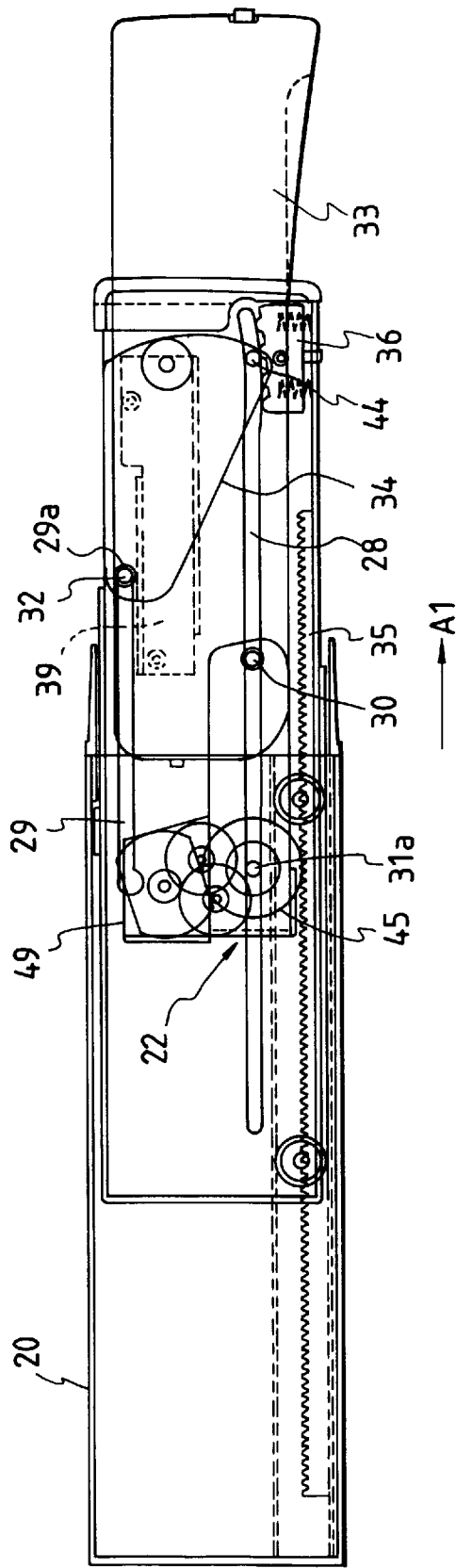
FIG. 12 is a side view of an operative state of the vehicle-mounted display detailed in FIGS. 1 to 8.

When only the movable bracket 22 advances to the position shown in FIGS. 11 and 12 after the intermediate case 21 and the fixed case 20 have been locked to each other in the state of FIG. 9, the third guide members 32 projecting from the link members 34 attached to the TV monitor 33 reach, at that position, opening-side ends 29a of the second guide slots 29, i.e. limit positions. Upon the guide members 32 abutting against the slot ends 29a at this time, the TV monitor 33 having so far moved in the horizontal posture is restricted in its further movement in the direction A1. Even after the movable bracket 22 has moved to the position shown in FIGS. 11 and 12, the motor 49 is continuously operated to cause the movable bracket 22 further advance in the direction A1. With this movement of the movable bracket 22, the first guide members 30 connected to the lateral surfaces of the TV monitor 33 also further advance in the first guide slots 28 formed in both the legs 21a of the intermediate case 21 in the direction A1. With the first guide members 30 advancing in the guide slots 28 after the third guide members 32 have been restricted by the ends of the second guide slots 29, the link members 34 start rotating about the third guide members 32 in the counterclockwise direction, and so does the TV monitor 33 coupled to the link members 34 through the pin members 44.

Figure 13:
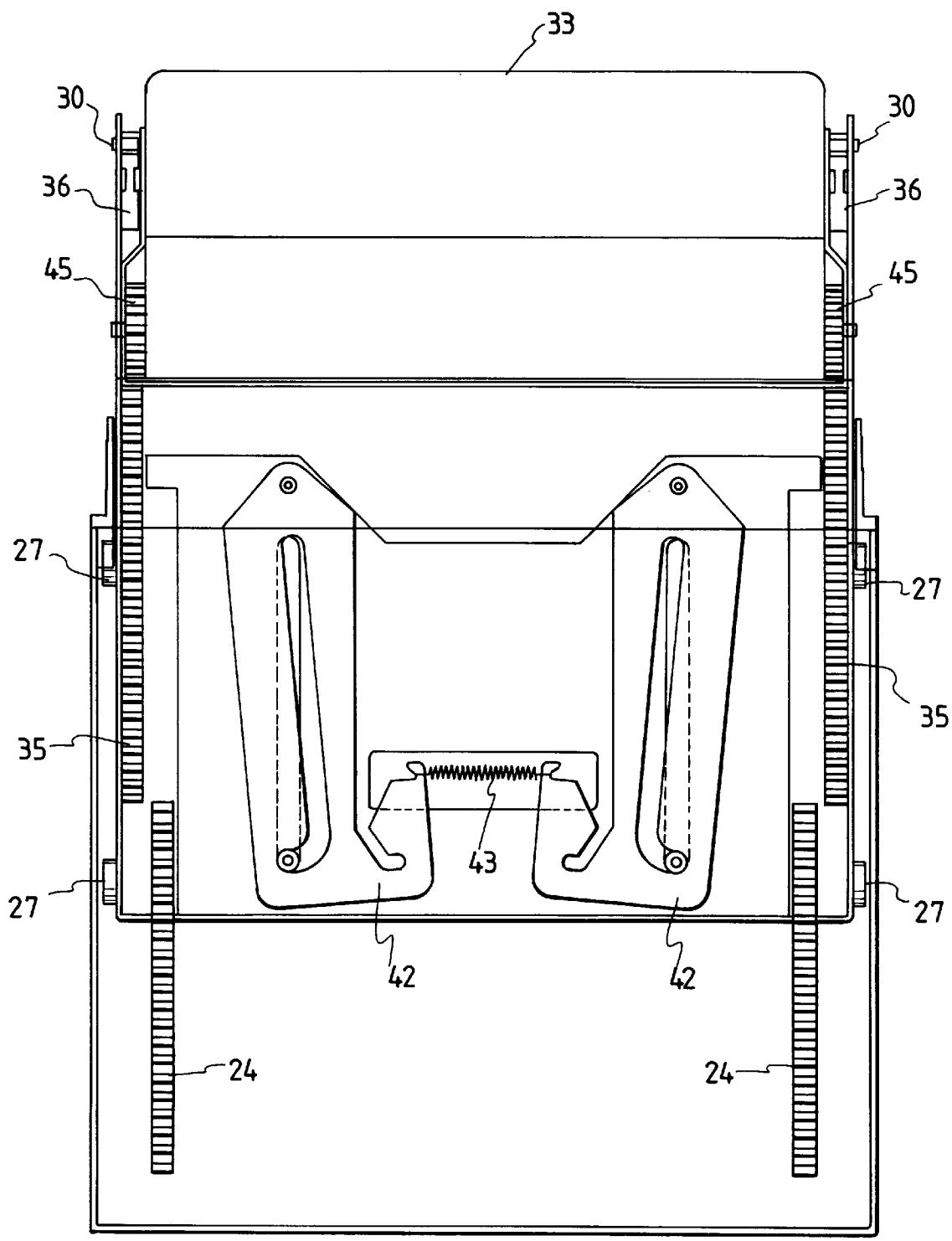
FIG. 13 is a plan view of an operative state of the vehicle-mounted display detailed in FIGS. 1 to 8 with the display raised.
Figure 14:
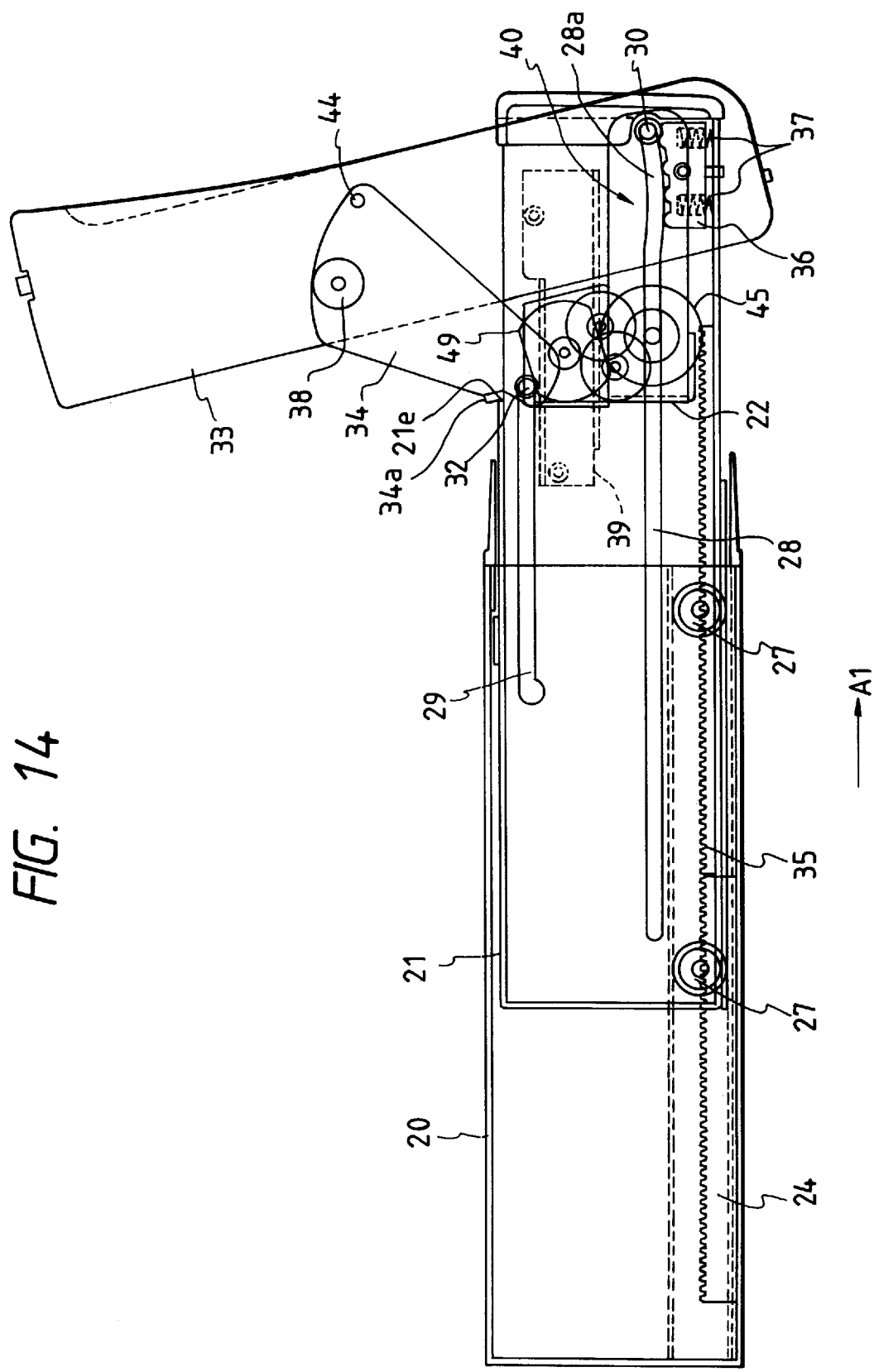
FIG. 14 is a side view of an operative state of the vehicle-mounted display detailed in FIGS. 1 to 8 with the display raised.
Figure 15:
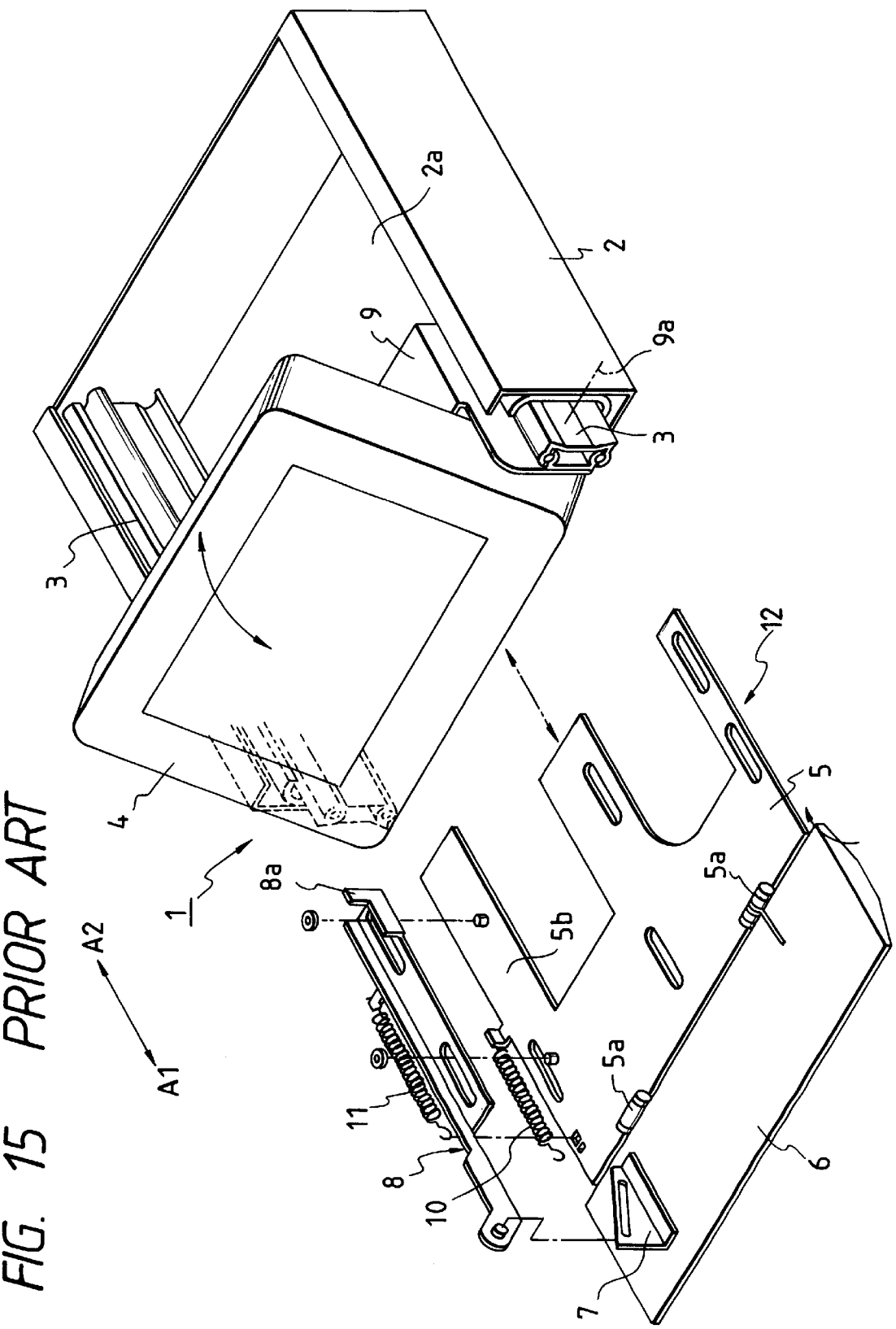
FIG. 15 is an exploded perspective view of a conventional vehicle-mounted display.
Figure 16:
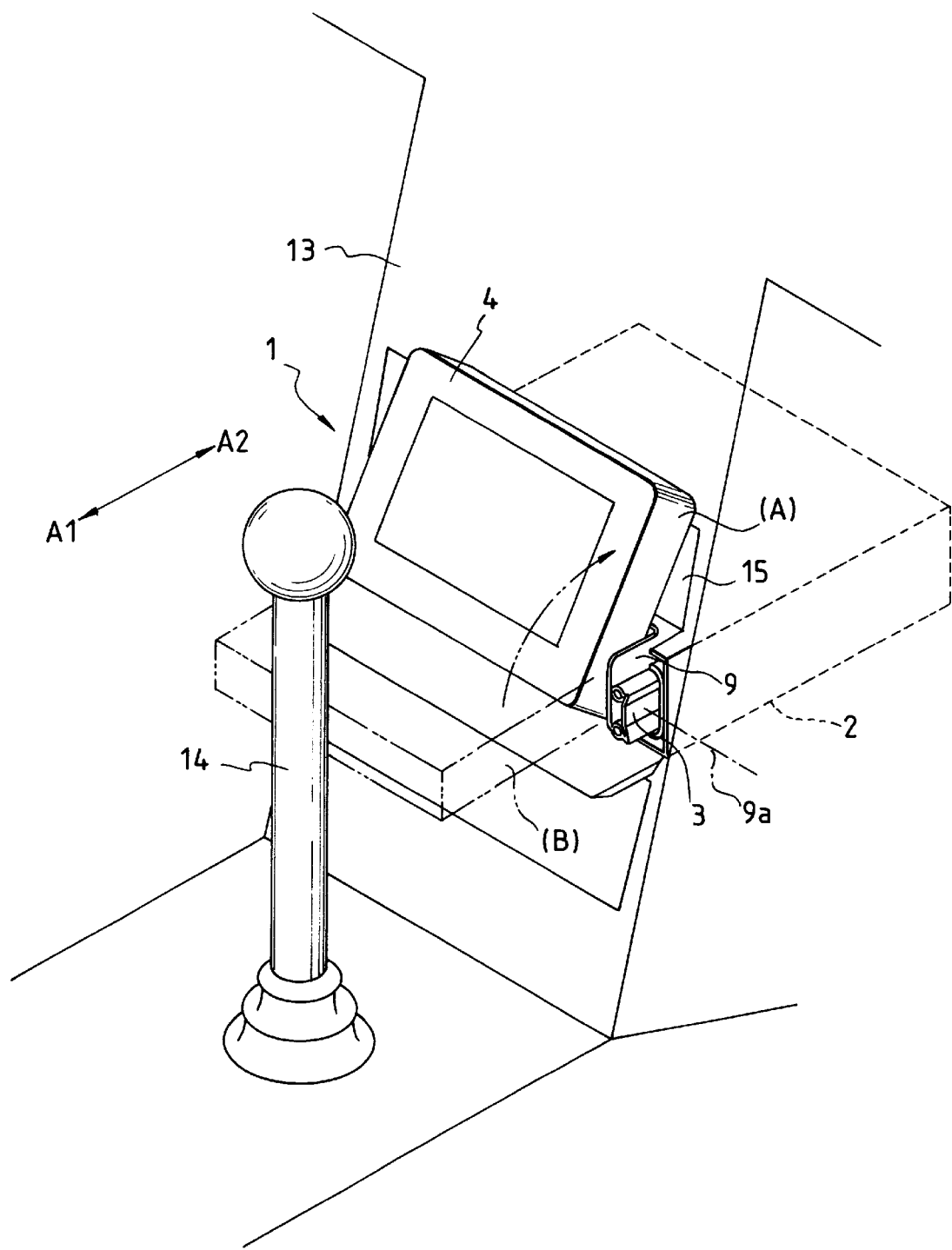
FIG. 16 is a perspective view of the vehicle-mounted display of FIG. 15 mounted in an automobile console panel.

In other words, the TV monitor 33 starts rotating in the counterclockwise direction from the position where it is not yet completely projected out of the fixed case 20, as shown in FIGS. 11 and 12. Then, at the time the first guide members 30 are moved to the curved portions 28a of the first guide slots 28, the rising operation of the TV monitor 33 is completed, as shown in FIGS. 13 and 14.

At the positions corresponding to the curved portions 28a of the first guide slots 28, the click members 36 are provided while being urged upwardly by the springs 37 as viewed in the drawings. Accordingly, the first guide members 30 engage in any of the concave portions 36e to 36g formed on the upper surfaces of the click members 36, whereby the rising angle of the TV monitor 33 can be optionally set in a stepwise manner.

When the TV monitor 33 starts the rising operation, the rollers 38 provided on the link members 34 escape upwardly through the openings 39a at upper front ends of the guide members 39 provided on the intermediate case 21. Also, at the time the first guide members 30 are moved to the first concave portions 36g of the click members 36, the abutment lugs 34a formed by bending parts of the link members 34 abut against the ends 21e of the bent portions 21d of the intermediate case 21 and serve as a stopper to prevent the link members 34 from further rotating in the counterclockwise direction from the posture shown in FIG. 14.

The rising angle of the TV monitor 33 can be detected by, for example, attaching a photosensor (sensor member) 55 to the movable bracket 22 as shown in FIGS. 9 or 11, and providing on an inner surface of the corresponding guide member 39 a plurality of striped reflecting members 53, 53, . . . (see FIG. 2) opposing the photosensor 55 when the TV monitor 33 is raised and the movable bracket 22 is moved to the position where the first guide members 30 engage in any of the concave portions 36e to 36g of the click members 36, and applying a signal from the photosensor 55 to a controller (not shown) for determining to which one of the reflecting members 53 the photosensor is facing. Accordingly, by outputting a control signal to stop operation of the motor 49 from the controller based on the input signal from the photosensor 5, the TV monitor 33 can be automatically set to any desired rising angle. Note that when the rising angle of the TV monitor 33 is not automatically set, the rising angle of the TV monitor 33 may be changed by manually rotating the TV monitor 33.

With the vehicle-mounted display having the structure as explained above, the TV monitor 33 can be driven to start rising from a condition that it is not yet completely projected out of the fixed case 20. Accordingly, when raising the TV monitor 33, it is not required to project the TV monitor 33 in the horizontal posture entirely out of the fixed case 20, whereby the distance by which the TV monitor 33 must be projected out can be reduced.

Also, with the illustrated embodiment, the raising of the TV monitor 33, advance/retraction of the movable bracket 22, and advance/retraction of the intermediate case 21 are all driven by the single motor 49. Therefore, the structure of the driving system is simplified and production cost reduced.

Further, in the illustrated embodiment the first rack members 24 are provided on the fixed case 20 and the second rack members 35 are provided on the intermediate case 21 so that when the intermediate case 21 is retracted into the fixed case 20, the first rack members 24 and the second rack members 35 are positioned side by side, and when the intermediate case 21 has advanced within the fixed case 20 through a predetermined distance, the first rack members 24 and the second rack members 35 are positioned so their teeth continue in series. Then, since the movable bracket 22 and the intermediate case 21 are moved on the first rack members 24 and the second rack members 35 through the common large gears 45, the TV monitor 33 can be moved by rack members which are much shorter than the advance/retraction distance of the TV monitor 33. As a result, the length of the fixed case 20 itself in the directions A1 and A2 is also shortened.

Additionally, while the illustrated embodiment includes the click mechanism 40 for temporarily locking the first guide members 30 under urging of the springs 43, the click mechanism may be arranged by providing a boss on the TV monitor 33 and attaching a lever to the guide of the intermediate case 21, the lever being supported by a spring and formed with a plurality of convex and concave portions engaging the boss on the TV monitor. With this modified click mechanism, the advantages are similar to that of the click mechanism explained in the illustrated embodiment.

Moreover, the display is not limited to being a TV monitor 33, and may be a display for displaying characters or still images using liquid crystals, LEDs, electro-luminescence and so on, or a navigation monitor for displaying where the vehicle is traveling.

According to the present invention, as described above, since the movable bracket is movable to advance and retract within the fixed case, and the raising mechanism for rotating the display member from a horizontal posture into a raised posture during advance of the movable bracket is provided between the movable bracket and the guides for guiding movement of the movable bracket, the raising operation of the display can be performed simultaneously with the display being moved out of the fixed case. Therefore, the distance by which the display is projected forward of the fixed case is reduced, and the display is prevented from striking against the vehicle gear shift lever.

Also, since the intermediate case is moved within the fixed case, the movable bracket is moved within the intermediate case, and the raising operation of the display is performed midway the movement of the movable bracket, the distance by which the display in the horizontal posture is projected out of the fixed case is reduced. Further, the movement of the display out of the fixed case and the raising operation thereof outside the fixed case can be performed merely by applying the moving force to the movable bracket, and therefore, the drive mechanism is simplified.

What is claimed is:

1. A vehicle-mounted display system comprising:
   a fixed case having an open end;
   a display movable in and out of the open end of said fixed case and rotated from a horizontal posture to a raised posture while said display is moving out of said fixed case;
   a movable bracket housed within the fixed case, the movable bracket supporting said display and capable of moving toward and away from the open end of said fixed case;
   guides provided in said fixed case and connected to said movable bracket; and a raising mechanism for rotating said display from the horizontal posture into the raised posture during movement of said movable bracket toward the open end;

wherein said raising mechanism comprises:

a first support point for rotatably coupling a lower end of said display in the raised posture to said movable bracket;

a second support point for rotatably coupling an intermediate portion of said display to a link member;

a third support point provided on said link member;

a restricting guide provided on said guides for allowing said third support point to move forward through a predetermined distance; and a raising guide substantially parallel to said restricting guide for guiding said first support point forward of said third support point when said movable bracket further advances after said third support point has been moved to a fore end of said restricting guide and restricted in its further movement.

2. A vehicle-mounted display system according to claim 1, further comprising a ratchet mechanism for setting a rising angle of said display in a stepwise manner, said ratchet mechanism being connected between said display and said guides.

3. A vehicle-mounted display system including a display movable in and out of a fixed case, the fixed case having an open end, the display being rotated from a horizontal posture to a raised posture while said display is moving out of said fixed case, said display system comprising:

an intermediate case housed within the fixed case, the intermediate case being capable of moving toward and away from the open end of said fixed case;

a movable bracket movably mounted on the intermediate case, the movable bracket supporting said display and capable of moving toward and away from the open end relative to said intermediate case;

a drive mechanism for applying a driving force to move said movable bracket toward the open end of the fixed case;

a lock mechanism for locking together said intermediate case and said fixed case when said intermediate case has moved a predetermined distance within said fixed case toward the open end;

guides provided on said intermediate case and connected to said movable bracket; and a raising mechanism for rotating said display from the horizontal posture into the raised posture during the movement of said movable bracket within said intermediate case toward the open end of the fixed case, after said intermediate case has been locked to said fixed case;

wherein said raising mechanism comprises:

a first support point for rotatably coupling a lower end of said display in the raised posture to said movable bracket;

a second support point for rotatably coupling an intermediate portion of said display to a link member;

a third support point provided on said link member;

a restricting guide provided on said guides for allowing said third support point to move forward through a predetermined distance; and a raising guide substantially parallel to said restricting guide for guiding said first support point forward of said third support point when said movable bracket further advances after said third support point has been moved to a fore end of said restricting guide and restricted in its further movement.

4. A vehicle-mounted display system according to claim 3, wherein said drive mechanism comprises:

a motor mounted on said movable bracket;

a gear supported by said movable bracket and driven by said motor;

a first rack member on said fixed case and meshing with said gear; and a second rack member on said intermediate case and meshing with said gear when said intermediate case has moved a predetermined distance within said fixed case toward the open end.

5. A vehicle-mounted display system according to claim 4, wherein when said intermediate case is retracted into said fixed case, both said rack members are positioned side by side, and when said intermediate case has moved a predetermined distance within said fixed case toward the open end, both said rack members are positioned so their teeth are in series.

6. A vehicle-mounted display system according to claim 4, further comprising:

a rotatable shaft having said gear attached adjacent an end thereof and rotatably supported by said movable bracket, wherein each end of said rotatable shaft projects out of said movable bracket and is movably inserted into guide slots formed in said intermediate case.

7. A vehicle-mounted display system according to claim 3, wherein said lock mechanism comprises:

a first lock for locking together said movable bracket and said intermediate case; and a second lock for locking together said intermediate case and said fixed case;

wherein said first lock is in a locked state and said second lock is in an unlocked state when said display member is stored in said fixed case, and said first lock is in an unlocked state and said second lock is in a locked state when said bracket member and said intermediate case locked together by said first lock have advanced through a predetermined distance within said fixed case.

8. A vehicle-mounted display system according to claim 3, wherein said lock mechanism comprises:

a lock arm having first and second lock recesses and pivotably supported on said intermediate case;

a first lock projection on said movable bracket and capable of engaging in said first lock recess; and a second lock projection on said fixed case and capable of engaging in said second lock recess;

wherein when said display is stored in said fixed case, said first lock projection engages in said first lock recess for locking said bracket member and said intermediate case together and said second lock projection does not engage in said second lock recess for allowing said intermediate case to move within said fixed case, and when said intermediate case has advanced through a predetermined distance within said fixed case, said lock arm is pivoted so that said first lock projection disengages from said first lock recess for allowing said bracket member to move with respect to said intermediate case and said second lock projection engages in said second lock recess for locking said intermediate case within said fixed case.

9. A vehicle-mounted display system according to claim 8, wherein said lock arm has a first sloped surface for guiding said first lock projection when said first lock projection enters said first lock recess, and a second sloped surface for guiding said first lock projection when said first lock projection escapes from said first lock recess.

10. A vehicle-mounted display system comprising:
   a fixed case having an open end;
   a display movable in and out of the open end of said fixed case and rotated from a horizontal posture to a raised posture while said display is moving out of said fixed case;
   a movable bracket housed within the fixed case, the movable bracket supporting said display and capable of moving toward and away from the open end of said fixed case;
   guides provided in said fixed case and connected to said movable bracket;
   a raising mechanism for rotating said display from the horizontal posture into the raised posture during movement of said movable bracket toward the open end; and
   a ratchet mechanism for setting a rising angle of said display in a stepwise manner, said ratchet mechanism being connected between said display and said guides;
   a first support point for rotatable coupling a lower end of said display in the raised posture to said movable bracket;
   a second support point for rotatable coupling an intermediate portion of said display to a link member;
   a third support point provided on said link member;
   a restricting guide provided on said guide for allowing said third support point to move forward through a predetermined distance; and
   a raising guide substantially parallel to said restricting guide for guiding said first support point forward of said third support point when said movable bracket further advances after said third support point has been moved to a fore end of said restricting guide and restricted in its further movement.

11. A vehicle-mounted display system according to claim 6, wherein said ratchet mechanism comprises:
   said first support point;
   a member having a plurality of concave portions in which said first support point engages; and
   a spring for urging said member in a direction to approach said first support point.

12. A vehicle-mounted display system according to claim 11, wherein said raising guide is formed having a front end portion thereof with a curved portion for allowing rotation of said first support point caused by the raising operation of said display, and said member is provided near said curved portion.

13. A vehicle-mounted display system according to claim 11, further comprising:
   a sensor member for detecting that said movable bracket has moved to a position where said first support point engages in any of said plural concave portions of said member; and
   a controller for controlling the movement of said movable bracket in response to the detection by said sensor member.

14. A vehicle-mounted display system according to claim 13, wherein said sensor member is a photosensor attached to said movable bracket, and further comprising a reflecting member facing said photosensor when said photosensor has moved to the position where said first support point engages in any of said plural concave portions of said member.

15. A vehicle-mounted display system including a display movable in and out of a fixed case, the fixed case having an open end, the display being rotated from a horizontal posture to a raised posture while said display is moving out of said fixed case, said display system comprising:
   an intermediate case housed within the fixed case, the intermediate case being capable of moving toward and away from the open end of said fixed case;
   a movable bracket movably mounted on the intermediate case, the movable bracket supporting said display and capable of moving toward and away from the open end relative to said intermediate case;
   a drive mechanism for applying a driving force to move said movable bracket toward the open end of the fixed case;
   a lock mechanism for locking together said intermediate case and said fixed case when said intermediate case has moved a predetermined distance within said fixed case toward the open end;
   guides provided on said intermediate case and connected to said movable bracket;
   a raising mechanism for rotating said display from the horizontal posture into the raised posture during the movement of said movable bracket within said intermediate case toward the open end of the fixed case, after said intermediate case has been locked to said fixed case; and
   a ratchet mechanism for setting a rising angle for said display in a stepwise manner, said ratchet mechanism being connected between said display and said guides;
   a first support point for rotatable coupling a lower end of said display in the raised posture to said movable bracket;
   a second support point for rotatably coupling an intermediate portion of said display to a link member;
   a third support point provided on said link member;
   a restricting guide provided on said guide for allowing said third support point to move forward through a predetermined distance; and
   a raising guide substantially parallel to said restricting guide for guiding said first support point forward of said third support point when said movable bracket further advances after said third support point has been moved to a fore end of said restricting guide and restricted in its further movement.

16. A vehicle-mounted display system including a display movable in and out of a fixed case, the fixed case having an open end, the display being rotated from a horizontal posture to a raised posture while said display is moving out of said fixed case, said display system comprising:
   an intermediate case housed within the fixed case, the intermediate case being capable of moving toward and away from the open end of said fixed case;
   a movable bracket movably mounted on the intermediate case, the movable bracket supporting said display and capable of moving toward and away from the open end relative to said intermediate case;
   a drive mechanism for applying a driving force to move said movable bracket toward the open end of the fixed case;
   a lock mechanism for locking together said intermediate case and said fixed case when said intermediate case has moved a predetermined distance within said fixed case toward the open end;

guides provided on said intermediate case and connected to said movable bracket; and a raising mechanism for rotating said display from the horizontal posture into the raised posture during the movement of said movable bracket within said intermediate case toward the open end of the fixed case, after said intermediate case has been locked to said fixed case;

wherein said lock mechanism comprises:

a lock arm pivotably supported on said intermediate case and having a guide slot extending substantially parallel to the direction of movement of said intermediate case;

a second lock recess formed in continuation with said guide slot and extending in a direction substantially perpendicular to said guide slot;

a first lock recess extending in a direction opposite to said second lock recess;

a spring for urging said lock arm to rotate in one direction;

a first lock projection provided on said bracket member and capable of engaging in said first lock recess of said lock arm; and a second lock projection on said fixed case and inserted in said second lock recess of said lock arm;

wherein when said display is stored in said fixed case, said second lock projection is positioned in said guide slot and said lock arm is pivoted in a direction against an urging force of said spring, so that said first lock projection engages in said first lock recess, and when said movable bracket and said intermediate case locked together have advanced through a predetermined distance within said fixed case, said lock arm is pivoted by the urging force of said spring so that said second lock projection enters from said guide slot into said second lock recess for locking said intermediate case to said fixed case and said first lock projection disengages from said first lock recess for allowing said movable bracket to move with respect to said intermediate case.

17. A vehicle-mounted display system according to claim 16, wherein said lock arm includes a pair of lock arms opposing to each other, said pair of lock arms having one end pivotably supported to said intermediate case with a spring stretched between free ends of said lock arms for urging said free ends together.

18. A vehicle-mounted display system according to claim 16, wherein said intermediate case includes a support plate having a slot extending parallel to the direction of movement of said intermediate case, said lock arm is rotatably supported on said support plate, and said second lock projection on said fixed case is inserted through both the guide slot of said lock arm and the slot of said support plate.

19. A vehicle-mounted display system according to claim 16, wherein said lock arm has a first sloped surface for guiding said first lock projection when said first lock projection enters said first lock recess, and a second sloped surface for guiding said first lock projection when said first lock projection escapes from said first lock recess.

20. A vehicle-mounted display system including a display movable in and out of a fixed case, the fixed case having an open end, the display being rotated from a horizontal posture to a raised posture while said display is moving out of said fixed case, said display system comprising:

an intermediate case housed within the fixed case, the intermediate case being capable of moving toward and away from the open end of said fixed case;

a movable bracket movably mounted on the intermediate case, the movable bracket supporting said display and capable of moving toward and away from the open end relative to said intermediate case;

a drive mechanism for applying a driving force to move said movable bracket toward the open end of the fixed case;

a lock mechanism for locking together said intermediate case and said fixed case when said intermediate case has moved a predetermined distance within said fixed case toward the open end;

a raising mechanism for rotating said display from the horizontal posture into the raised posture by a moving force of said movable bracket while said movable bracket moves within said intermediate case toward the open end of the fixed case and after said intermediate case has been locked;

wherein said lock mechanism comprises:

a lock arm pivotably supported on said intermediate case and having a guide slot extending substantially parallel to the direction of movement of said intermediate case;

a second lock recess formed in continuation with said guide slot and extending in a direction substantially perpendicular to said guide slot;

a first lock recess extending in a direction opposite to said second lock recess;

a spring for urging said lock arm to rotate in one direction;

a first lock projection provided on said bracket member and capable of engaging in said first lock recess of said lock arm; and a second lock projection on said fixed case and inserted in said second lock recess of said lock arm;

wherein when said display is stored in said fixed case, said second lock projection is positioned in said guide slot and said lock arm is pivoted in a direction against an urging force of said spring, so that said first lock projection engages in said first lock recess, and when said movable bracket and said intermediate case locked together have advanced through a predetermined distance within said fixed case, said lock arm is pivoted by the urging force of said spring so that said second lock projection enters from said guide slot into said second lock recess for locking said intermediate case to said fixed case and said first lock projection disengages from said first lock recess for allowing said movable bracket to move with respect to said intermediate case.

* * * * *

UNITED STATES PATENT AND TRADEMARK OFFICE
CERTIFICATE OF CORRECTION

PATENT NO. : 5,847,685
DATED : December 8, 1998
INVENTOR(S) : Akira Otsuki It is certified that error appears in the above-identified patent and that said Letters Patent is hereby corrected as shown below:

In claim 10, line 19, please change "rotatable" to --rotatably--.

In claim 10, line 22, please change "rotatable" to --rotatably--.

In claim 15, line 31, please change "rotatable" to --rotatably--.

Signed and Sealed this

Twenty-fourth Day of April, 2001

*Attest:*

NICHOLAS P. GODICI

*Attesting Officer*   *Acting Director of the United States Patent and Trademark Office*